United States Patent [19]

Seidel

[11] Patent Number: 4,514,027
[45] Date of Patent: Apr. 30, 1985

[54] CONNECTORIZED CABLE AND METHODS OF MAKING

[75] Inventor: Roland H. Seidel, Cobb County, Ga.

[73] Assignee: AT&T Technologies, Inc., New York, N.Y.

[21] Appl. No.: 426,055

[22] Filed: Sep. 28, 1982

[51] Int. Cl.³ ............................................. H01R 13/58
[52] U.S. Cl. ..................................... 339/105; 29/861; 339/99 R
[58] Field of Search .............. 339/99 R, 105; 29/861, 29/871

[56] References Cited

U.S. PATENT DOCUMENTS

| | | | |
|---|---|---|---|
| 3,772,635 | 11/1973 | Frey et al. | 339/99 R |
| 3,858,158 | 12/1974 | Henn et al. | 339/99 R |
| 4,097,106 | 6/1978 | Over et al. | 339/99 R |
| 4,148,138 | 4/1979 | Becker et al. | 29/749 |
| 4,262,985 | 4/1981 | Muehlhausen | 339/99 R |

OTHER PUBLICATIONS

Gablehouse et al., "Preconnectorization Comes of Age", Telephony, pp. 32–34, 36, 40, 44, 92, Apr. 6, 1981.

Primary Examiner—Eugene F. Desmond
Attorney, Agent, or Firm—E. W. Somers

[57] ABSTRACT

A connectorized cable includes a cable having a plurality of conductors (28-28) each of which is disposed in a tortuous path through a conductor-receiving groove (71) and an associated aligned opening between teeth (37-37) of an elongated connector which is made of a dielectric material. The grooves are formed along a shelf (45) which is spaced below the openings between the teeth. Portions (79-79) of the groove walls (73-73) are sheared to form latching tabs which are deflected inwardly into securing engagement with the conductors in the grooves and which cause portions of the conductors to extend into apertures at the bottoms of the grooves. The tortuous path of each conductor and the deflected tab portions of the walls cooperate to cause the conductor to be maintained within its groove and to prevent its inadvertent movement. Because of its connection to a wall of the connector and the interposition of displaced plastic material between it and the wall, each tab is locked in engagement with a conductor.

14 Claims, 8 Drawing Figures

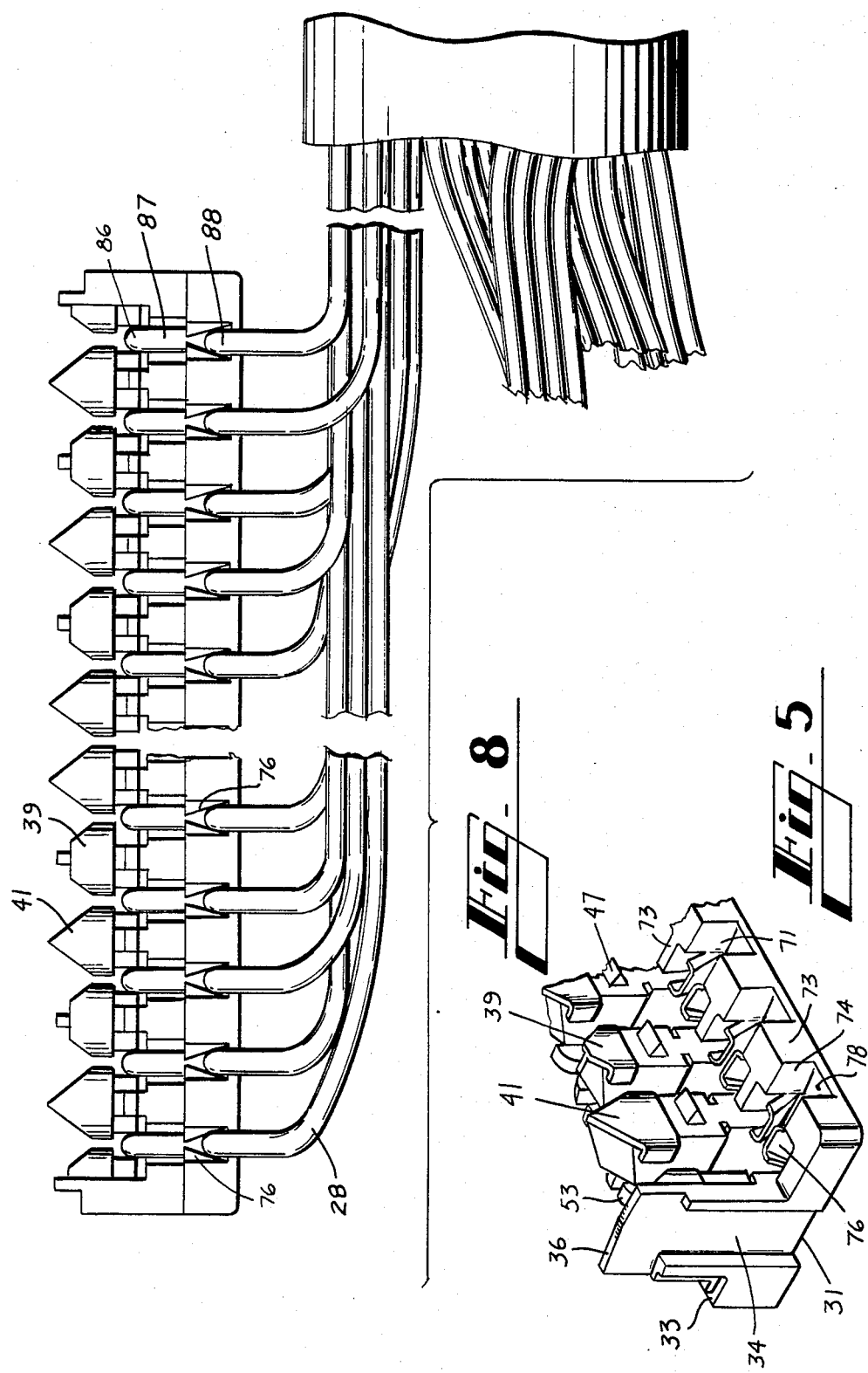

CONNECTORIZED CABLE AND METHODS OF MAKING

TECHNICAL FIELD

This invention relates to a connectorized cable and to methods of making. More particularly it relates to a connector to which are assembled a plurality of insulated conductors of a cable and to methods of causing the conductors to be secured to the connector.

BACKGROUND OF THE INVENTION

Lengths of communications cables are connected together in the field at splice locations. A variety of connectors have been made available in the marketplace for splicing together pluralities of insulated conductors without the necessity of removing the insulation from the conductors. One such connector is disclosed and claimed in U.S. Pat. No. 3,858,158 which issued on Dec. 31, 1974 in the names of R. W. Henn et al. The above-identified patented connector includes an elongated index strip for holding a plurality of insulated conductors of a first cable in a spaced array and a connector module which includes a plurality of bifurcated beam type metallic contact elements. When the connector module is assembled to the index strip, end portions of the contact elements become electrically connected to the conductors of the first cable held in the index strip. Then, the conductors from a second cable are assembled to the connector module so that the opposite end portions of the contact elements are electrically connected to them and hence to the conductors of the first cable.

Generally, the splicing is accomplished by installers who use a tool such as that shown in E. Becker et al U.S. Pat. No. 4,148,138 which issued on Apr. 10, 1979, to assemble corresponding pluralities of insulated conductors of cable ends to a connector. Such an operation is expensive and at times is carried out under somewhat trying conditions such as in a manhole, for example.

While the Henn et al connector has been found to be well adapted to the splicing of cables in the field, much attention has been given to the connection of cable ends to connectors within a factory environment prior to shipping. The factory connectorization of cable ends results in an economical splicing technique in which an installer in the field merely assembles together the components of a connector system without the need for assembling the conductors to the components.

It has been found that the above-identified Henn et al connector system is easily adaptable to the factory connectorization of cable ends. However, special steps must be taken to insure that the conductors remain secured to the connector components during shipment of the cable for if they become separated, the factory connectorization will have saved nothing. This is no problem in the connector module since the conductors are held not only between plastic teeth which grip the conductors but also because each conductor is held within a slot of the bifurcated beam of a contact element. On the other hand, the security of the conductors to the index strip relies only on the capability of teeth between which the conductors are disposed to grip the conductor ends. This would present no problem if only one gauge conductor were to be spliced by this particular connector, but since it must serve to splice several gauge sizes, dependence on the grip by adjacent teeth alone is imprudent.

In order to solve this problem, modifications to the index strip as shown in the Henn et al patent have been introduced. Specifically, the index strip has been formed to include a shelf extending from one side with a plurality of grooves formed therealong and aligned with the conductor-receiving slots between the plastic teeth in the original design strip. Conductor ends are moved into the slots between the teeth and then routed into those in the shelf. Then an elongated retainer strip having a plurality of spaced ribs formed therealong is assembled to the index strip so that each rib is moved into an associated shelf groove and into engagement with the conductor end therein. The dimensions of the retainer strip ribs and the shelf grooves are such that the retainer strip remains secured to the shelf in an interference fit, thereby securing the conductors to the index strip.

While the foregoing arrangement overcomes the problem of retaining conductors in the index strip during shipment, it requires another component which introduces additional expense. What is needed and what is not provided by the prior art is an arrangement for securing a plurality of conductors to a connector component without the need for additional parts and with a minimum of labor.

SUMMARY OF THE INVENTION

A connector arrangement of this invention secures a plurality of conductors in a manner which prevents inadvertent movement of end portions of the conductors. This arrangement is particularly suited to the needs of factory connectorization of cables to be spliced in the field.

The connectorized cable arrangement includes a cable that comprises a plurality of conductors and a connector for holding the conductors of the cable in a spaced array. The connector which is made of a plastic material includes an elongated plastic member having plurality of spaced grooves being defined by walls of the connector with portions of the conductors being disposed in preselected ones of the grooves. Also, portions of the connector are reformed in include facilities for securing the conductors in the connector against unintended movement. These facilities include a plurality of latching tabs. At least one latching tab extends obliquely from a wall of each of the preselected grooves into enclosing relationship with the portion of the conductor therein. The latching tabs are connected to the walls adjacent to inverts of the grooves.

In one embodiment, the connectorized cable comprises a length of cable which includes a plurality of conductors that are held in a spaced array along an index strip. The index strip is made of a plastic material and has a plurality of spaced conductor-receiving openings formed along its length between adjacent ones of a plurality of teeth. The index strip includes a laterally extending shelf having a plurality of spaced grooves formed therealong and aligned with the conductor-receiving openings. Further, the index strip includes a plurality of apertures which extend through the shelf and open to the grooves. A conductor end portion is received in each of the conductor-receiving openings and extends into the associated groove in the shelf. Portions of the side walls which define each shelf groove are sheared to provide latching tabs which are deflected inwardly into enclosing engagement with the conductor in each groove to secure the conductor therein. The latching tabs cause a portion of each conductor in each groove to extend into the aperture in that groove.

Each of the conductors that is positioned in the index strip is secured against unintentional movement. This result is achieved because of the gripping provided by the latching tabs that have been moved into engagement with the conductors enhanced by the tortuous path in which each of the conductors is disposed. Each conductor includes portions that extend through a conductor-receiving opening and through a groove and into its aperture in the shelf connected through a portion that is disposed along a side face of the index strip above the shelf. The sheared tabs are locked in engagement with the conductors because of the way in which they are formed. Each tab is connected integrally to its parent wall along a hinge and along a portion of each side. Plastic material forming the remainder of each side is interposed between the tab and the parent wall to maintain each tab in its deflected position.

BRIEF DESCRIPTION OF THE DRAWINGS

Other features of the present invention will be more readily understood in the following detailed description of specific embodiments thereof when read in conjunction with the accompanying drawings, in which;

FIG. 5 is a perspective view of a portion of another embodiment of the index strip;

FIG. 8 is a plan view of the index strip showing a plurality of conductors connected thereto and adapted to be spliced in the field.

DETAILED DESCRIPTION

Figure 1:
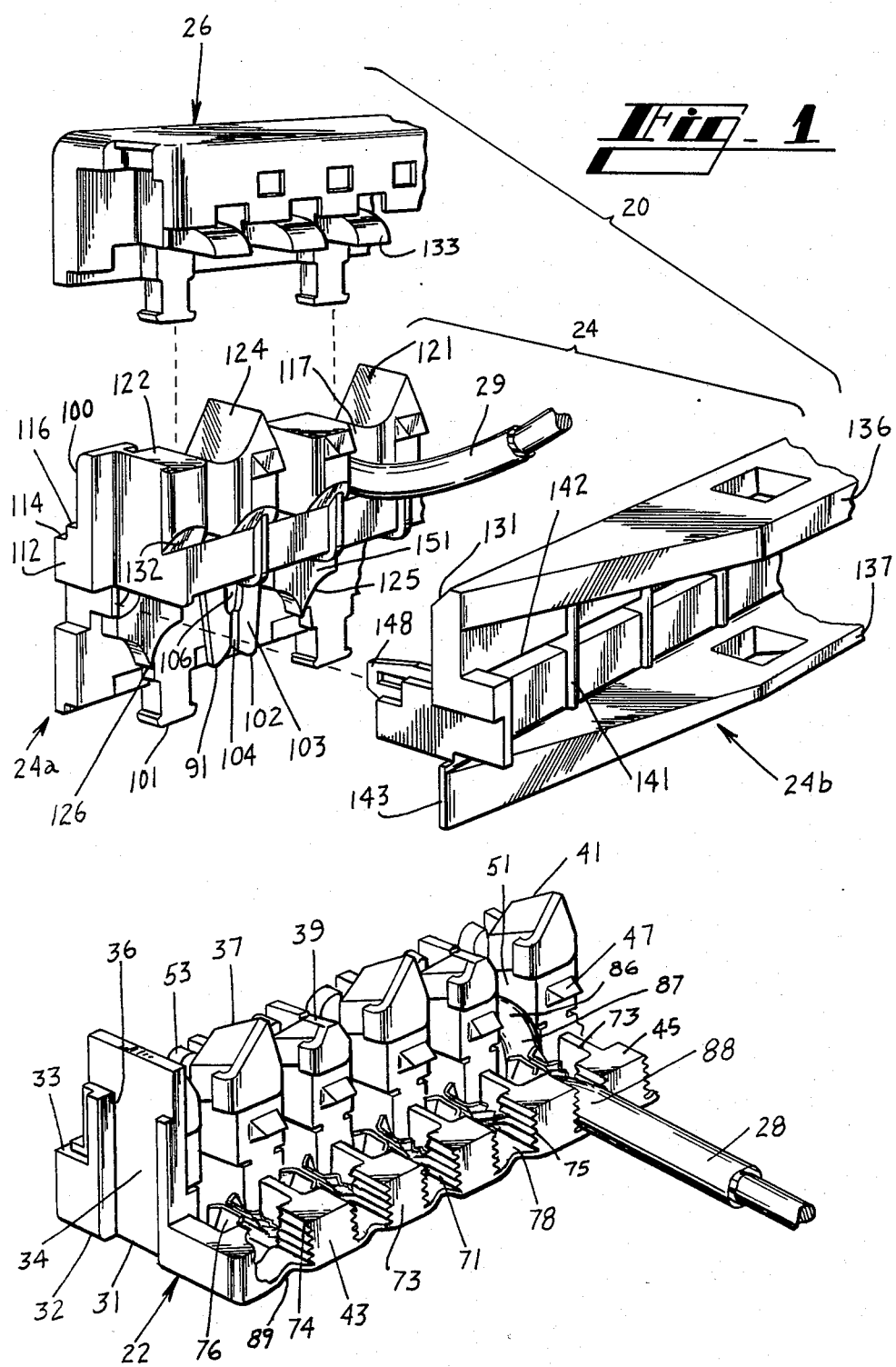
FIG. 1 is an exploded perspective view of an electrical connector which embodies the principles of this invention and which includes an index strip, a connector module and a module cap, together with one conductor of a plurality which are to be assembled to the index strip.

Referring now to FIG. 1, there is shown an electrical connector which is designated generally by the numeral 20. The electrical connector 20 includes an index strip, which is designated generally by the numeral 22, a connector module, which is designated generally by the numeral 24, and a cap designated generally by the numeral 26. The connector 20 provides the capability for connecting together electrically at least one or more conductors 28—28 of a first cable to one or more conductors 29—29 of a second cable.

As can best be seen in FIG. 1, the index strip 22 includes a base 31 having a generally flat lower surface 32 and a ledge 33. The index strip 22 is made of a dielectric material such as polycarbonate, for example. A wall 34 extends vertically from each end of the base 31 and includes a guide slot 36.

A plurality of spaced teeth 37—37 projects vertically from the base 31 between the end walls 34—34. The teeth 37—37 alternately are formed with flattened top surfaces 39—39 and wedge-shaped ends 41—41. The teeth 37—37 are recessed from a side surface 43 of the index strip to create a shelf 45. Each of the teeth 37—37 includes a latching nub 47 on one side surface thereof.

Figure 2:
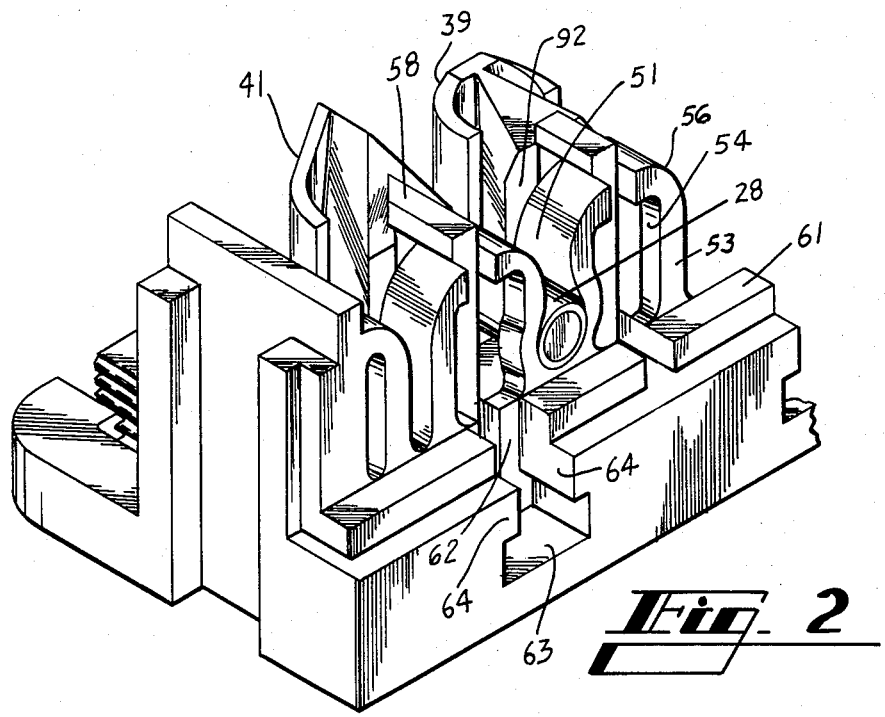
FIG. 2 is a perspective view of a portion of the index strip.
Figure 3:
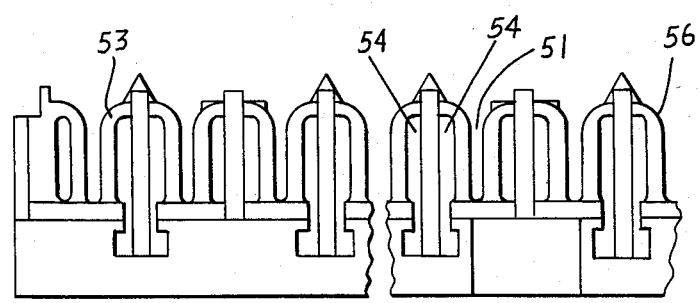
FIG. 3 is an elevational view of one side of the index strip which is shown in FIG. 2.

The index strip 22 is provided with facilities for receiving the conductors 28—28 of the first cable. Conductor-receiving openings or slots 51—51 are formed between adjacent ones of a plurality of upright arms 53—53 (see FIGS. 2 and 3) along the side of the index strip opposite that along which the teeth 37—37 are formed. Each of the conductor-receiving slots 51—51 is aligned with an associated one of the spaces between adjacent ones of the teeth 37—37.

The arms 53—53 are formed by two spaced slots 54—54 (see FIGS. 2-3) which are molded in a riser 56 aligned with each of the teeth 37—37 and connected thereto by a web 58. Absent one of the conductors 28—28 in one of the slots 51—51, the arms 53—53 defining the slot are vertical and separated by a substantially constant distance (see FIG. 3). When one of the conductors 28—28 is introduced into the slot 51, the associated arms 53—53 deflect horizontally away from each other in the vicinity of the conductor in the direction longitudinally of the index strip 22. Because of their mode of suspension, the arms 53—53 bend toward each other in the region above the conductor (see FIG. 2). This reverse bend in each of the arms 53—53 serves to snub and secure the conductors 28—28 within the index strip 22.

A platen surface 61 having an edge notch 62 is formed along the index strip 22 adjacent to the risers 56—56. The surface 61 serves as a conductor-cutting anvil to facilitate severing the conductors 28—28 in a plane congruent with the outwardly facing surface of the risers. The platen surface 61 is interrupted periodically by openings 63—63 which have snap-in entrance wings 64—64. Each of the openings 63—63 is aligned laterally with the teeth 37—37 having the wedge shaped ends 41—41 and are disposed between the adjacent pairs of the conductor-receiving slots 51—51.

The index strip 22 includes additional facilities to further facilitate the retention of the conductors. Viewing now FIGS. 1 and 4, it is seen that the shelf 45 includes a plurality of grooves 71—71 which are aligned with the conductor-receiving slots 51—51. The walls of the shelf 45 are designed to cause conductors which are received in the grooves 71—71 to be snubbed and held secured to the index strip 22 while the cable which is terminated by the index strip 22 is transported to the field.

Figure 4:
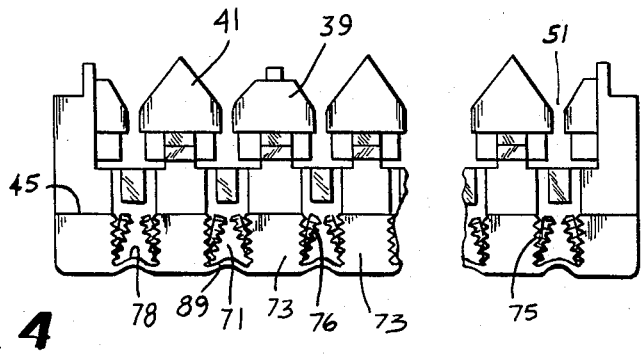
FIG. 4 is an elevational view of the index strip of FIG. 2 taken from an opposite side.

Viewing again FIGS. 1 and 4, it is seen that an entrance portion to each groove 71 is defined by walls 73—73. In a preferred embodiment, surfaces 74—74 of the walls 73—73 of the grooves 71—71 are formed with corrugations 75—75 which help secure larger gauge size conductors which are received therein. Although in a preferred embodiment, the outer portions 74—74 of the walls 73—73 are corrugated, they could be smooth surface walls (See FIG. 5). It is important that the entrance portions to the grooves 71—71 be capable of receiving the largest gauge size conductor with the application of manual force only. This allows the conductors 28—28 to be positioned manually across the index strip 22 in preparation for seating by a tool.

After the conductors 28—28 have been positioned in the index strip 22 extending through the slots 51—51 and directed downwardly toward entrance portions of the grooves 71—71, the ends extending past the ledge surface 33 are severed. Then tooling (not shown) is operated in order cause the conductors on the other side of the index strip to be seated fully in the grooves 71—71.

At the same time, the tooling is caused to shave or shear portions of the sidewalls 73—73, which define the portions of the grooves, between the outer portions 74—74 and the teeth 37—37. This causes portions 76—76 (see FIGS. 1 and 4-6) of the walls in that region between the outer portions 74—74 and the teeth 37—37 to be separated from the remaining portions of the walls and to be deflected inwardly obliquely into securing engagment with the conductors 28—28. The portions 76—76 are referred to as latching tabs.

Each sheared tab 76 remains connected to its associated wall along a plastic hinge 77 adjacent to an invert 78 of the groove 71. The invert 78 spans between sides of a groove 71. Also, each tab 76 is connected to its wall 73 along a lower portion 79 of each side edge. While upper portions 81—81 of the side edges of each tab 76 have been separated from the adjacent wall 73 because of the pivotal movement, they remain disposed between the tab and the walls. As a result, each locking tab 76 is locked in its deflected position in engagement with the portion of a conductor 28 in the groove 71.

In the preferred embodiment shown in FIG. 1, tabs 76—76 are provided with corrugations 75—75 and are sheared from each side of each of the grooves 71—71. However, the conductors 28—28 may be secured with one sheared tab in each groove.

Figure 7:
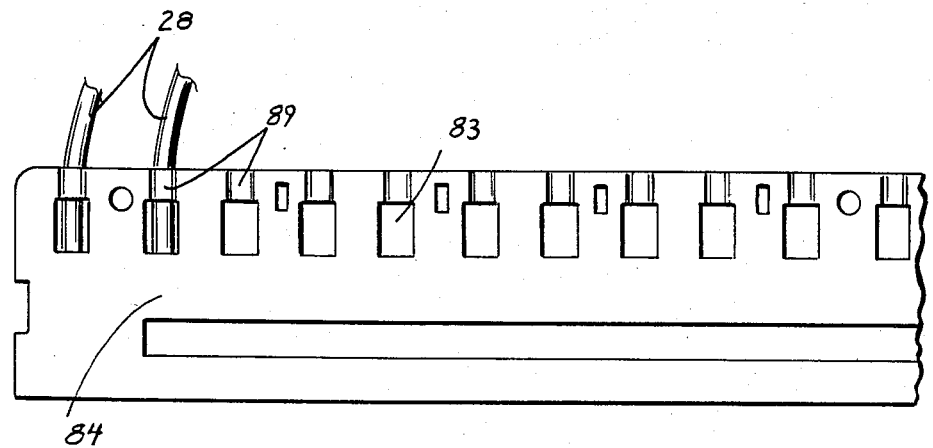
FIG. 7 is a plan view of an underside of the index strip.
Figure 6:
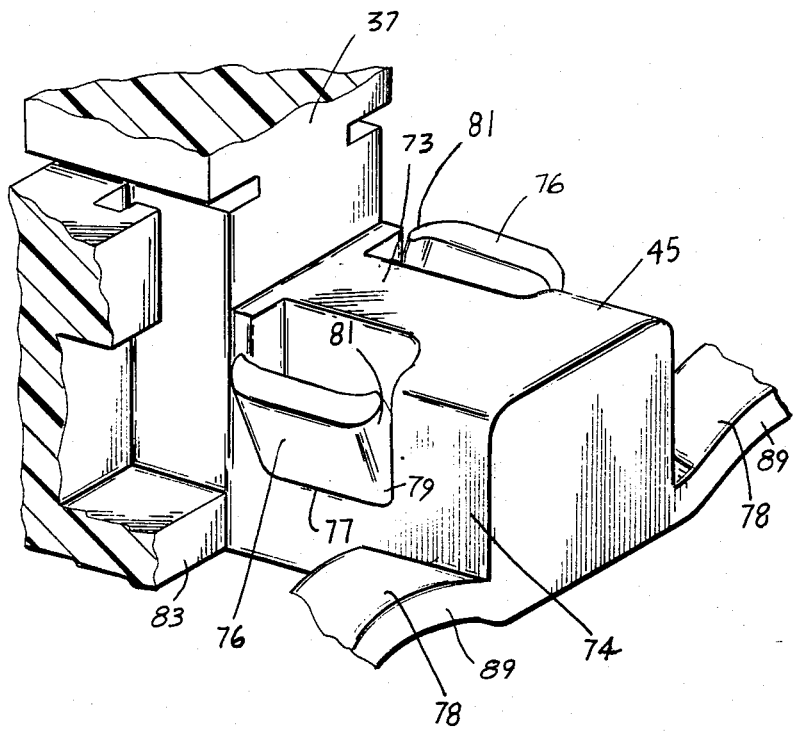
FIG. 6 is a perspective view showing the details of latching tabs which are formed in the index strip.

A preferred embodiment of the connector is capable of being reused. To facilitate reuse, the index strip 22 is formed with apertures 83—83 (see FIG. 7) along a lower surface 84 of the shelf 45 that are aligned with associated grooves 71—71. A lower left-hand portion of the index strip in FIG. 1 is broken away to show an aperture 83 in relation to an invert 78. A tool (not shown) is insertable into the apertures 83—83 to urge the conductors 28—28 out of the grooves. The applied forces are sufficient to overcome the locking forces of the latching tabs 76—76 and to move the tabs pivotally toward their parent walls 73—73 where they remain until they are repositioned in a later reuse of the index strip 22. Subsequently, conductors may be inserted into the grooves 71—71 and tooling caused to be operated to redeflect the latching tabs 76—76 into enclosing relationship with them. The material of the index strip and the disposition of the latching tabs relative to their parent walls provide for their reuse with substantially undiminished latching capabilities.

The latching tabs 76—76 cooperate with the routing of the conductors 28—28 to secure the conductors 28—28 to the index strip 22. The routing of the conductors 28—28 in tortuous paths enhances their security to the index strip 22. As can best be seen in FIGS. 1 and 8, each conductor 28 extends in a run 86 through a conductor-receiving opening 51, then downwardly for a short vertical run 87, and then in a right angle turn to a run 88 that is substantially parallel to the run 86.

In the preferred embodiment, arched entrance portions 89—89 of the grooves 71—71 cooperate with the apertures 83—83 to cause the paths of the conductors 28—28 to be further tortuous. The tabs 76—76 urge portions of the conductors 28—28 into the apertures 83—83 while the arched portions 89—89 increase the elevation of the portions of the conductors at the entrances to the grooves. With this arrangement, the conductors 28—28 secured to the index strip 22 are capable of resisting pulling forces in the range of three pounds.

The index strip 22 which terminates or holds the conductors 28—28 of a first cable, is adapted to be assembled with a connector module 24 (see FIG. 1) that terminates the conductors 29—29 of a second cable to which the first is to be spliced. The electrical connection between conductors 28—28 and 29—29 of the two cables is effected through a plurality of metallic contact elements 91—91 which are mounted in the connector module 24. First ends of the contact elements 91—91 slice through the insulation of the conductors 28—28 which are held in the conductor-receiving slots between the arms 53—53 and in engagement with the shelf 45. Conductors 29—29 from the second cable are connected to second ends of the contact elements 91—91 in the connector module 24 so that when the connector module is assembled to the index strip 22 in the field, the preconnectorized cables are connected together electrically.

The index strip 22 also includes provisions for receiving one end of each of the plurality of the contact elements 91—91 (see FIG. 1) of the connector module 24 when it is mounted on the index strip in the field. A well 92 (see FIG. 2) is defined between each two adjacent webs 58—58 and the inwardly facing surfaces of adjacent riser 56—56 and the inwardly facing surfaces of adjacent associated ones of the teeth 37—37. The well extends below the inverts of the conductor receiving slots 51—51. The wells 92—92 are designed to receive one end of each of the metallic contact elements 91—91 when the connector module 24 is assembled to the index strip 22.

The connector module 24 comprises mating portions 24a and 24b which are assembled together to secure the plurality of contact elements 91—91 within a housing 100 in a spaced relationship that corresponds to the spacing of the conductors 28—28 disposed along the index strip 22. As further can be seen in FIG. 1, the housing 100 is formed with a plurality of downwardly extending legs 101—101 which are received in the openings 63—63 in the index strip in order to secure the connector module to the index strip. The connector module 24 as well as the cap 26 are described in detail in U.S. Pat. No. 3,858,158 which issued on Dec. 31, 1974 and which is incorporated by reference hereinto.

As can be seen partially in FIG. 1, each of the contact elements 91—91 includes two opposed bifurcated beams 102—102 with the furcations 103—103 at each end thereof defining a conductor-receiving slot 104 therebetween. An elongated slot 106 communicates with the conductor-receiving slot 104 and extends toward a central portion (not shown) of the contact element. Each of the contact elements 91—91 is held within the housing 101 such that one of its beams extends downwardly toward the index strip 22 and the other upwardly to receive one of the conductors 29—29 of the second cable. When the connector module 24 is assembled to the index strip 22, the furcations 103—103 of one bifurcated beam of each contact element 91 is received in a well 92 of the index strip and a conductor 28 is received in the slot 104. Inasmuch as the conductors 29—29 have been priorly positioned in the slots 91—91 at the other ends of the beams 102—102, the mounting of the connector module 24 to the index strip 22 in the field causes the second cable to be connected electrically to the first.

An upper portion of the face 112 of the connector module 24 terminates along an edge of a ledge 114 which is spaced below a platen 116. The platen 116 serves as a conductor-cutting anvil. A plurality of latching openings (not shown) for the cap 26 are formed along adjacent to the ledge 114 and open to the sidewall thereof.

The housing 100 of the connector module 24 is molded to include a plurlity of risers (not shown) substantially identical in their structure and function to the risers 56—56 of the index strip. The risers extend upwardly from the platen 116 and are each molded with two slots to form upright arms. Adjacent ones of the arms of the risers of the connector module define conductor-receiving slots 117—117 for holding ones of the conductors 29—29.

The housing 100 also is formed with the plurality of teeth 121 (see again FIG. 1). Alternate ones of the teeth 121—121 have a flattened top surface 122 while the others have a wedged shaped surface 124. Each of the teeth 121—121 is connected to an associated one of the risers by a narrow web (not shown).

As is shown in FIG. 1, the part 24a of the connector module 24 includes arches 125—125 which are formed by downwardly extending conductor-stuffers 126—126. The contact elements 91—91 are mounted in the part 24a such that the slot 104 of each is aligned with an associated one of the stuffers 126—126. The mounting of the connector module 24 on the index strip 22 seats the conductors in engagement with the inverts of the slots 51—51. Each stuffer 126 bears upon an insulated conductor 28 lodged in one of the slots 51—51 to ensure that the conductor is secured with its slot.

Referring now to FIG. 1, it is seen that the part 24b is formed with a snubbing brace 131 having a downwardly tapered surface. When the parts 24a and 24b are mated, the snubbing brace 131 engages a snubbing surface 132 which is formed on the portion 24a. This gives the conductors 29—29 an upward turn and forces the conductors into engagement with deflecting beams 133—133 formed in the cap 26.

From FIG. 1 it is seen that the part 24b includes laterally extending rails 136 and 137 which are adapted to receive a bridging connector (not shown) therebetween. Midway between each pair of adjacent ridges 141—141 and aligned with the waist section of each of the contact elements 91—91, there is provided a bridging slot 142 which provides electrical access to one of the contact elements.

As can be seen in FIG. 1, the part 24b adjacent the lower rail 137 is molded with a bottom brace 143 which functions as a snubbing bar. When the connector module 24 is assembled to the index strip 22, the snubbing brace 143 effects bending contact with the insulated conductors 28—28. Along the length of the brace 143 are latching holes (not shown) spaced to receive the latching nubs 47—47 of the index teeth 37—37 of the index strip 22 when the module 24 is mounted on the index strip.

The part 24b is formed to secure the contact elements 91—91 when mated with the part 24a. The part 24b is formed with a plurality of projecting members (not shown) which are inserted into associated holes in the part 24a. Ends of the projecting members are deformed adjacent an outer face of the part 24a in a staking operation to secure together the parts 24a and 24b. The contact elements 91—91 are mounted on plateaus 151—151. The reception of the projecting members in the openings through the part 24a causes them to engage center waist sections of the contact elements 91—91 and to secure the contact elements within the connector module 24.

In the general use of the connector 20 of this invention, a plurality of the conductors 28—28 are inserted into the index strip 22 in a multi-step procedure. In a first step, the conductors are inserted into the slots 51—51 with portions thereof extending angularly to the entrances of the grooves 71—71. Then tooling (not shown) is operated to cause the conductors to be turned at a 90° angle and seated into the grooves 71-71. At the same time, the tooling causes portions of the sidewalls 73—73 to be shaved or sheared with those portions, hereinbefore referred to as latching tabs 76—76, being deflected obliquely inwardly into engagement with the conductors 28—28. Conductors 29—29 of a second cable are caused to be inserted into the slots 117—117 of the connector module 24. These conductors are caused to enter the conductor-receiving slots 104—104 formed between the furcations 103—103 of the ends of the contact elements 91—91 which are exposed adjacent to the teeth 121—121.

Advantageously, the latching tabs 76—76 prevent unintended movement of the conductors 28—28 after they have been positioned in the index strip 28 and before the index strip is assembled in the field to the connector module 24 that terminates the second cable. The securing of the conductors 28—28 in the index strip 22 is enhanced by their disposition in the slots 51—51 of the index strip and by the routing of the conductors in tortuous paths which include the slots 51—51, the right angle portions 87—87, and the grooves 71—71.

In the field, a craftsperson causes the connector module 24 to be assembled to the index strip 22 of the first cable to which the second cable is desired to be spliced. This causes the conductors 28—28 which are disposed in the slots 51—51 of the index strip to be moved into the conductor-receiving slots 104—104 formed between the furcations of the downwardly depending ends of the contact elements in the connector module 24. As a result, the conductors 28—28 of the first cable become connected electrically to the conductors 29—29 of the second cable.

It is to be understood that the above-described arrangements are simply illustrative of the invention. Other arrangements may be devised by those skilled in the art which will embody the principles of the invention and fall within the spirit and scope thereof.

What is claimed is:

1. A connectorized cable comprising:
   a cable which includes a plurality of conductors; and
   a connector holding said conductors of said cable in a spaced array, said connector comprising:
   an elongated plastic member which includes a plurality of spaced grooves being defined by walls of said connector with portions of said conductors being disposed in preselected grooves; and
   a plurality of latching tabs which extend obliquely into the preselected grooves into enclosing relationship with the conductor portions therein and which are connected to said walls adjacent to inverts of said grooves to secure the conductors against unintended movement, each said latching tab being integral with an associated one of said walls along one portion of said each tab, which is adjacent and parallel to the invert of the groove defined by said associated wall, and along sides adjacent to said one portion, and further each said tab being formed by a partially separated portion of its associated wall which has been moved pivotally about said one portion and deflected inwardly into enclosing relationship with a conductor portion with portions of said sides of each latching tab being disconnected from its associated wall but interposed between the tab and its associated wall to maintain the tab locked in enclosing relationship with the conductor portion.

2. A connectorized cable comprising:
a cable which includes a plurality of conductors; and
a connector holding said conductors of said cable in a spaced array, said connector comprising:
an elongated plastic member which includes a plurality of spaced grooves being defined by walls of said connector with portions of said conductors being disposed in preselected grooves; and
a plurality of latching tabs which extend into the preselected grooves into enclosing relationship with the conductor portions therein and which are connected to said walls adjacent to inverts of said grooves to secure the conductors against unintended movement, wherein opposing portions of the walls which define each preselected groove form opposing latching tabs which extend obliquely toward each other into engagement with the portion of the conductor which is positioned in said each groove, and wherein said tabs are partially sheared from groove walls and remain connected to the walls along portions adjacent to inverts of the grooves and along portions of adjacent sides, said side portions being effective to lock said tabs in engagement with said conductor portions.

3. The connectorized cable of claim 2, wherein each tab is spaced from at least one end of an associated preselected groove.

4. The connectorized cable of claim 3, which also includes a plurality of apertures spaced along an underside of said elongated member and aligned with said grooves to permit insertion of a tool that may be used to apply forces to the conductors in the grooves to move said latching tabs toward said walls to allow the conductors to be removed from the grooves, said conductor portions in said preselected grooves extending into said apertures to cause each said conductor portion to be disposed in a tortuous path.

5. The connectorized cable of claim 2, wherein said elongated member includes a base, a plurality of teeth upstanding from and spaced along said base with adjacent ones of said teeth forming conductor-receiving openings therebetween, and a shelf disposed along one side of said teeth with said grooves being formed in said shelf and being aligned with said openings between said teeth.

6. The connectorized cable of claim 5, wherein said shelf is spaced from said conductor-receiving openings to cause each said conductor which extends through one of said openings between said teeth to be turned at a substantially right angle along a side of said elongated member and then at a substantially right angle into one of said grooves, each of said conductors being secured to said connector by a cooperation of the conductor being disposed in a tortuous path from one of said conductor-receiving openings through one of said grooves and engaged by at least one latching tab.

7. The connectorized cable of claim 6, wherein portions of said walls between said tabs and said side surface of said shelf are corrugated.

8. A connector for holding conductors of a cable in a spaced array, said connector comprising:
an elongated plastic member which includes a plurality of spaced grooves being defined by walls of said connector with portions of the conductor capable of being disposed in preselected grooves; and
a plurality of latching tabs which are adapted to be extended into the preselected grooves into securing relationship with the conductor portions therein and which are connected to said walls adjacent to inverts of said grooves to secure conductors against unintended movement, wherein each latching tab is integral with an associated one of said walls along one portion of the tab, which is adjacent and parallel to the groove defined by said associated wall, and along sides adjacent to said one portion, and wherein each said tab is formed by a partially separated portion of its associated wall which is adapted to be moved pivotally about said one portion and deflected inwardly into enclosing relationship with a conductor portion whereupon portions of said sides of each said latching tab are disconnected from its associated wall but interposed between the tab and its associated wall to maintain the tab locked in the enclosing relationship with the conductor portion.

9. The connector of claim 8, wherein opposing portions of the walls, which define each preselected groove, form opposing latching tabs which extend obliquely toward each other into engagement with the portion of the conductor which is positioned in said each groove.

10. The connector of claim 8, wherein said elongated member includes a base and a plurality of teeth upstanding from and spaced along said base with adjacent ones of said teeth forming conductor-receiving openings therebetween, said elongated member also including a shelf disposed along one side of said teeth and spaced below said conductor-receiving openings with said grooves being formed in said shelf and being aligned with said openings between said teeth.

11. The connector of claim 8, wherein each said tab is formed along a portion of each preselected groove and is spaced from at least one end of said groove, said connector also including a plurality of apertures spaced along a surface of said elongated member opposite to that to which said grooves open and aligned with said grooves, the conductor portions in said preselected grooves extending into said apertures to cause each said conductor portion to be disposed in a tortuous path.

12. A method of connectorizing a cable, said method comprising the steps of:
causing each of a plurality of conductors of a cable to be positioned in one of a plurality of grooves of an index strip which is made of a plastic material; and
shearing a portion of at least one wall which defines each said groove to form a pivotally moveable tab which is deflected inwardly into enclosing engagement with the conductor in the groove, the step of shearing being accomplished to cause a portion adjacent an invert of the groove and at least portions of sides of each tab to remain integral with the wall from which it is formed and to cause remaining side portions to be disposed adjacent to the wall to lock said tab in enclosing relationship with the conductor in the groove.

13. The method of claim 12, wherein the step of causing each conductor to be positioned in a groove includes the steps of:

causing an end portion of each of a plurality of conductors to extend between a conductor-receiving opening formed between adjacent teeth, which are upstanding along the index strip and which are aligned with the grooves, and an outer portion of a groove formed in a shelf that is disposed below each opening; then causing each conductor to be seated within each opening and within each associated aligned groove.

14. The method of claim 13, wherein each conductor is caused to extend through an opening, then in a run at a substantially right angle to the run through the opening, and then through a groove in a run which is substantially parallel to the run through the opening.

* * * * *